United States Patent [19]
Gardiner, III et al.

[11] 3,941,005
[45] Mar. 2, 1976

[54] POWER TRANSMISSION BELT

[75] Inventors: William J. Gardiner, III, Lakewood; Arthur L. Aymami, Aurora, both of Colo.

[73] Assignee: The Gates Rubber Company, Denver, Colo.

[22] Filed: Mar. 3, 1975

[21] Appl. No.: 554,793

[52] U.S. Cl. .............................. 74/233; 156/142
[51] Int. Cl.² ........................................ F16G 5/16
[58] Field of Search .......... 74/233, 232, 234, 231 R; 156/142

[56] References Cited
UNITED STATES PATENTS

| | | |
|---|---|---|
| 3,416,383 | 12/1968 | Jensen et al. .................... 74/233 |
| 3,478,613 | 11/1969 | Wang et al. ..................... 74/233 |
| 3,820,409 | 6/1974 | Meadows ......................... 74/233 |
| 3,869,933 | 3/1975 | Dorf ............................. 74/234 |

*Primary Examiner*—Samuel Scott
*Assistant Examiner*—A. Russell Burke
*Attorney, Agent, or Firm*—H. W. Oberg, Jr.; Raymond Fink; Curtis H. Castleman, Jr.

[57] ABSTRACT

A center cord line V-belt having a longitudinally extending load-carrying tensile section of cord interpositioned between first and second layers with substantially the same fabrication construction which includes at least two plies of bias fabric disposed in an elastomeric matrix of the first and second layers near the inner and outer circumferential surfaces of the V-belt.

4 Claims, 3 Drawing Figures

POWER TRANSMISSION BELT

BACKGROUND OF THE INVENTION

The invention relates to machine elements and mechanisms, but more particularly, the invention relates to gearing with a laminated, plural driving surface V-belt.

There are several constructions of endless power transmission belts or so called V-belts in current use. The belts are used in many applications where they operate around various size sheaves at high tensile loads. It is important that the belts have good transverse rigidity to support the cords of the tensile section without significantly impairing its flexibility for bending around various diameter sheaves. The majority of belts in use today support the load carrying tensile cord with a first elastomeric layer inwardly of the cord that is thicker than a second elastomeric layer that is positioned outwardly of the tensile cord. The inner elastomeric layer is subject to compression forces while the outer elastomeric layer is subjected to tension forces when the belt is operated around sheaves. The first or inward layer is oftentimes referred to as the "undercord" or "compression section" while the second or outward layer is referred to as the "overcord" or "tension section."

The undercord must have sufficient modulus to support the tensile section of cords so that the belt cross-section does not significantly deform as the opposing side edges of the belt are forced against the flanges of a sheave. In reality, the undercord does not perfectly support the tensile cords as the belt enters the sheaves. There is deformation of the belt which places a higher stress level on those cords at the edge of the belt. After the belt leaves the sheave in its endless path, the belt cross-section resumes its normal shape. Consequently, the undercord must have sufficient rigidity to adequately support the tensile cords as they are continuously cycled between high and low stress levels upon entry and exit from a sheave. A V-belt bends or flexes about its neutral axis which is primarily, if not completely, defined by the cords of the tensile section. Consequently, the undercord of a belt is cycled to compression and the overcord of the belt is cycled to tension upon its entry into a rotating sheave.

Generally speaking, rubber has better flex fatigue characteristics when cycled in compression than it does when it is cycled in tension. This is but one of many reasons why present belts have an overcord that is substantially thinner than the undercord. For example, the undercord thickness may comprise 78 percent of the total belt thickness whereas the overcord would comprise only 22 percent of the total belt thickness. This allows the overcord to be stretched to a degree that is less than the degree to which the undercord is compressed. The difference in degree of stretch somewhat compensates for the lower fatigue life of the rubber in tension in the overcord.

Two processes are in general use today for making belts. The first process involves shaping the belt by skiving into its trapezoidal or "V-section" prior to curing or vulcanization. Materials skived from the edges may be economically reprocessed.

The belt making process of the second type involves curing a sleeve and then shaping individual belts to a V-profile. The skivings between belts cut from a sleeve are fully cured and therefore are not readily reusable.

One way to eliminate the waste of the cured skivings is to build a belt sleeve with a center cord line and then cut the belts in a manner as disclosed by Lejeune in U.S. Pat. No. 2,153,966. Every other belt cut from the sleeve is inverted for proper upright orientation. Inversion slightly pre-tensions the overcord and pre-compresses the undercord. Cutting the sleeve in such a manner is an expedient to avoid waste. However, a belt so produced has an overcord thickness that is substantially equal to the undercord thickness. As brought forth above, a thick overcord introduces fatigue problems while a thin undercord yields less material for transversely supporting the cords of the tensile section.

Some early individually molded belts such as disclosed by Delzell in U.S. Pat. No. 1,432,973 are made by spirally wrapping several layers of rubberized fabric together to form a sleeve. Uncured belts also are cut from the sleeve in a manner requiring every other belt to be inverted to an upright position. The belts are stretched prior to vulcanization to relieve compression of the inner peripheries. While such belts are homogeneous, they are not suited for more modern high power transmission applications because they lack a high modulus tensile section with transverse support means. Also, such belts flex about an undetermined axis whereas belts with a high modulus tensile section flex about the axis of the tensile section. Flexing about an undetermined axis introduces problems with undercord and overcord fatigue.

Thus, the problem associated with such belts is to have the undercord and overcord of a symmetrical construction so that an invertedly cured belt has substantially the same physical characteristics as an adjacently cut and cured upright belt. Summarily, prior art belts have problems primarily with premature overcord fatigue.

SUMMARY OF THE INVENTION

A center cord line V-belt is provided which has substantially the same construction in the first and second layers which establish a belt undercord and overcord. At least two plies of woven fabric are disposed on the bias in each layer. One ply of bias fabric is located at the inner and outer peripheral surfaces of each layer and the second ply of bias fabric is inwardly spaced from the ply. Spirally wound cord interpositioned between the layers defines the belt tensile section. Reinforcement means are disposed in both the undercord and overcord juxtaposed the cords to provide transverse support.

It is an object of the invention to provide a construction for V-belts to be cut from a sleeve with no skiving waste where the undercord and overcord exhibit substantially the same physical properties for both inverted and upright belts so cut.

Another object of the invention is to provide a substantially thick overcord construction which does not prematurely fatigue and which is inversely similar to the belt undercord.

Still another object of the invention is to provide a belt construction with a center line cord tensile section that is adequately transversely supported for transmitting power between sheaves.

The advantage of the invention is that skiving waste is eliminated and a belt construction is provided which permits simultaneous fabrication of upright and inverted belts from a single belt sleeve.

These and other objects or advantages of the invention will be apparent after reviewing the drawings and description thereof wherein.

DESCRIPTION OF PREFERRED EMBODIMENT

In accordance with the invention, an endless power transmission V-belt 10 is made by laminating several plies of material together in a generally symmetrical manner to form a belt sleeve 12. The sleeve is cured in known manner and a plurality of belts are cut from the sleeve.

Figure 1:
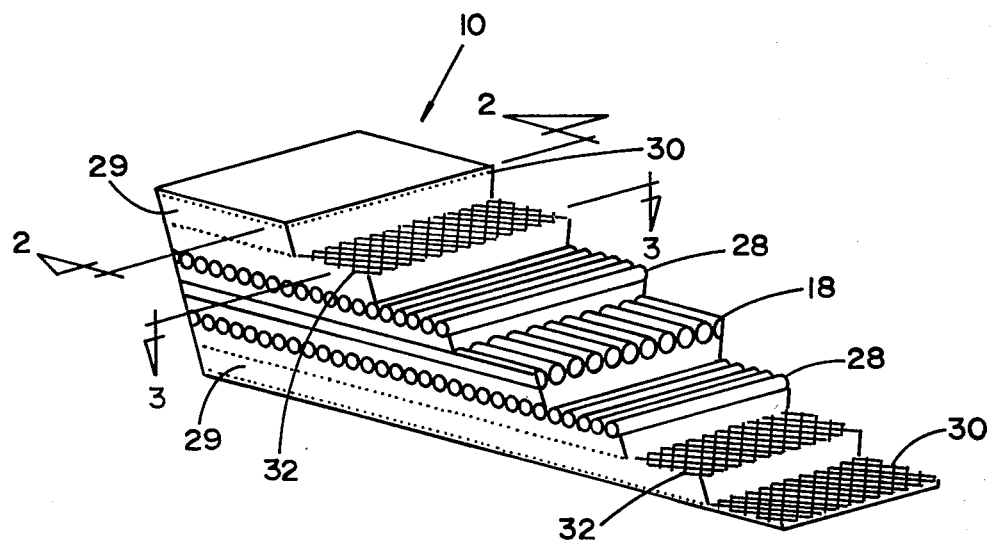
FIG. 1 is an isometrical cutaway view showing a V-belt of the invention.
Figure 2:
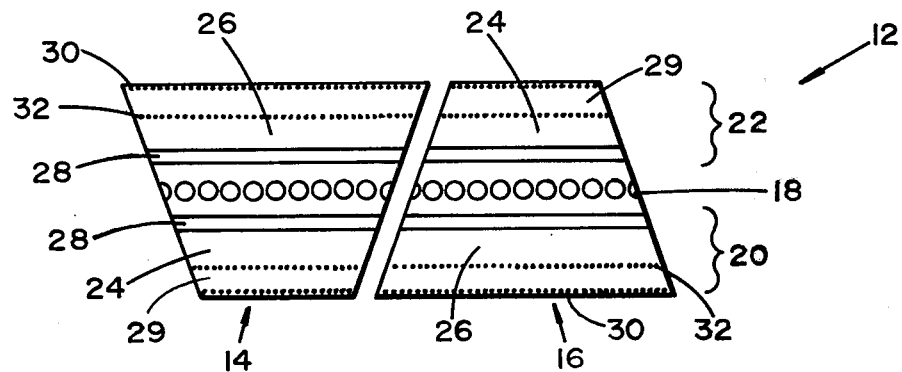
FIG. 2 is a cross-sectional view in the direction 2—2 of a partial sleeve showing an upright belt and an inverted adjacent belt of the same construction.
Figure 3:
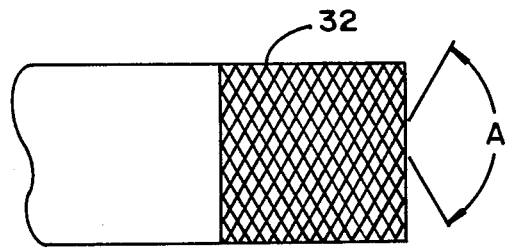
FIG. 3 is a partial view taken along the line 3—3 of FIG. 1 showing the bias fabric reinforcement.

The sleeve is cut in a manner along the lines disclosed by Lejeune where every other belt cut is alternately upright 14 and inverted 16 as schematically shown in cross-section by FIG. 2. The cutting technique avoids waste by eliminating skivings between adjacent belts.

The generally symmetrical arrangement of the reinforcement materials permits every other belt to be inverted to an upright position so that the adjacently cut belts have substantially the same physical characteristics.

Each belt is constructed with a center line tensile section 18 of spirally wound cord interpositioned between two substantially symmetrical layers 20, 22 of reinforced elastomeric material. When a belt is cut in the upright position 14 from the sleeve 12 the first layer 20 defines the belt undercord 24 and the second layer 22 defines the belt overcord 26. When the belt is in its inverted position 16, the second layer 22 defines the undercord 24 and the first layer 20 defines the overcord 26.

The tensile section 18 may be constructed in known manner using known materials. For example, the tensile section may be of one or more twisted cord bundles comprised of one or more strands. High modulus materials such as polyester, nylon, fiber glass, aramid, or the like are used to define the cord bundle. Belts turned inside out from the inverted cut position to the upright position, invert about the axis of the high modulus center line cords. Thus, a belt cut in the upright position has substantially the same circumferential length as a belt that is turned upright from the inverted cut position.

The layers 20, 22 comprising the undercords and overcords are made with any of the typical elastomers used in belt constructions. Materials may include the natural rubbers, synthetic rubbers, blends of natural or synthetic rubbers, polyester, polyurethane, or the like. The elastomeric material comprises the principal portion of the V-belt volume. The material is chosen for its flexibility and durability to resist bending cycles when the belt is operated around pulleys.

Means 28 for transversely supporting the cord of the tensile section 18 are disposed in the first and second layers at substantially equidistant from either side of the tensile section 18. Of course, the radially intermost means is circumferentially shorter than the radially outward transverse support means. The difference in circumference may lead to an insignificantly greater number of reinforcements than the radially outermost layer of the upright pre-cut belt when compared to an invertedly cut belt that has been turned to the upright position.

Although several types of reinforcement may be used as the transverse support means 28, a cross-cord arranged at substantially 90° to the tensile cord is preferred. Other tensile section supporting means may be used such as that disclosed in U.S. Pat. No. 3,820,409 to Meadows in which bias cords are oppositely aligned on either side of the tensile section. Elastomeric stock with transversely aligned fibers may also be used.

At least two plies of fabric 30, 32 are disposed in the elastomeric matrix on the bias in both the first and second layers. The first ply 30 is disposed at each peripheral surface of the first and second layer, and the second ply 32 is disposed, inwardly equidistant 29 of the first ply in both the first and second layers. The two plies of fabric are effective in significantly reducing overcord cracking in the center cord line belt. The weft and warp threads in the first ply 30 of the fabric are disposed at an angle A that is greater than 95° and less than 160°. The second plies 32 may have an angle A that is substantially 90° or have the same angle A as the first ply. Preferably, the angle A is 122°.

The fabric is able to act as a reinforcement to substantially inhibit overcord cracking without materially affecting belt flexibility. Additional plies of fabric may be symmetrically disposed equidistant from the tensile section in the first and second layers. Additional plies in the undercord section further aid the transverse support means in supporting the tensile section. Overcord cracking is substantially inhibited when the angle A is greater than 90° and preferably near 122°.

The first plies of fabric have an angle A that may be equal to but not less than the second or additional plies. The angle A may progress from smaller to larger as the plies become a farther distance away from the tensile section. It has been determined that such a construction gives the overcord progressively more flexibility from the tensile section to the peripheral surface of the first ply.

The symmetrical construction of the layers relative to tensile section permits substantially identically performing belts to be manufactured from a sleeve where alternate belts are invertedly cut and turned to an upright position. The fabric disposed at the peripheral surface of the layers act to substantially preclude catastrophic cracking in the belt overcord. The angle A in the overcord becomes smaller as the belt is bent around a sheave; this aligns the threads of the fabric more to a longitudinal position which enhances flexibility. The angle A in the undercord becomes larger as the belt is bent around a sheave; this aligns the threads of the fabric more to a transverse position which enchances support of the tensile section. Thus, by altering the angle A of successive plies of bias fabric, the effective flexibility of the overcord and transverse support of the undercord may be altered to minimize overcord cracking and maintaining tensile section support. It should be noted that the concept of forming a fabric with weft and warp threads at an obtuse angle as set forth in U.S. Pat. No. 2,519,590 and utilized as disclosed in U.S. Pat. No. 3,478,613 in a V-belt, presents an entirely different unsymmetrical laminated construction where bias fabric is not disposed at the inner and outer peripheral surfaces primarily as a means of inhibiting cracking of a substantially thick overcord. The present invention, however, utilizes such a fabric in an entirely different manner, as part of a symmetrical structure, and thereby provides an entirely new combination. Primarily, the present invention provides a construction where belts cut upright and inverted from the same sleeve exhibit substantially the same performance characteristics.

Although the present description is limited to certain, specific embodiments, these are not intended to limit the scope of the invention which is to be determined from the appended claims.

What is claimed is:

1. A V-belt comprising:
   an endless tensile member;
   at least two layers of which the first and second layers principally composed of elastomeric material and having substantially the same thickness, the first layer disposed inwardly and the second layer disposed outwardly of the tensile member;
   means for transversely supporting the tensile member, the transverse support means disposed in the first and second layers substantially equidistant inwardly and outwardly from the tensile member;
   a first ply of bias fabric disposed substantially at the outer peripheral surfaces of the first and second layers, the first ply disposed substantially equidistant from the tensile member and having an angle A between weft and warp threads between 95° and 160°; and
   a second ply of bias fabric disposed substantially equidistant from the first ply of bias fabric in each of the first and second layers.

2. A belt as set forth in claim 1 wherein the first and second layers are cut to form the oppositely facing side of the V-belt.

3. A belt as set forth in claim 1 comprising additional plies of bias fabric disposed in each of the first and second layers substantially equidistant from the tensile member, the threads of the additional plies bias fabric having an included angle between weft and warp threads that is no greater than that angle between weft and warp of the first ply.

4. A belt as set forth in claim 1 wherein each layer has the same number of plies of bias fabric.

* * * * *

UNITED STATES PATENT AND TRADEMARK OFFICE
Certificate

Patent No. 3,941,005                                            Patented March 2, 1976

William J. Gardiner, III and Arthur L. Aymami

Application having been made by William J. Gardiner, III and Arthur L. Aymami, the inventors named in the patent above identified, and The Gates Rubber Co., Denver, Colorado, a corporation of Colorado, the assignee, for the issuance of a certificate under the provisions of Title 35, Section 256, of the United States Code, deleting the name of William J. Gardiner, III as a joint inventor, and a showing and proof of facts satisfying the requirements of the said section having been submitted, it is this 5th day of Jan. 1982, certified that the name of the said William J. Gardiner, III is hereby deleted from the said patent as a joint inventor with the said Authur L. Aymami.

FRED W. SHERLING,
*Associate Solicitor.*